May 26, 1970     W. L. SMALLEY     3,514,149
TRAILER
Filed May 24, 1968
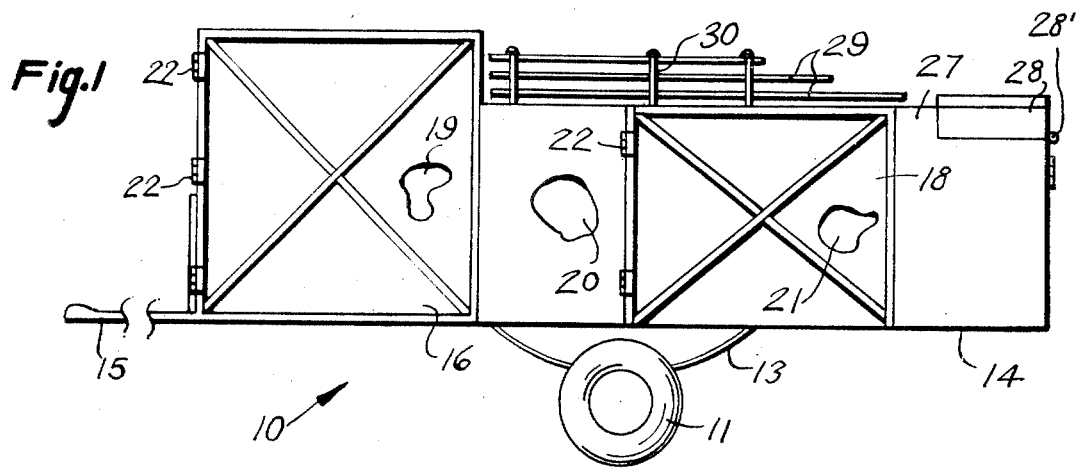
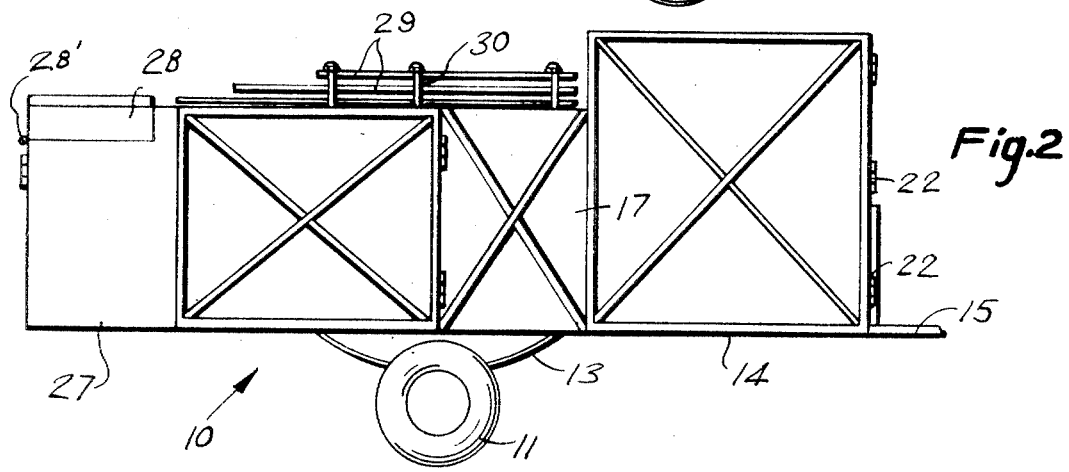
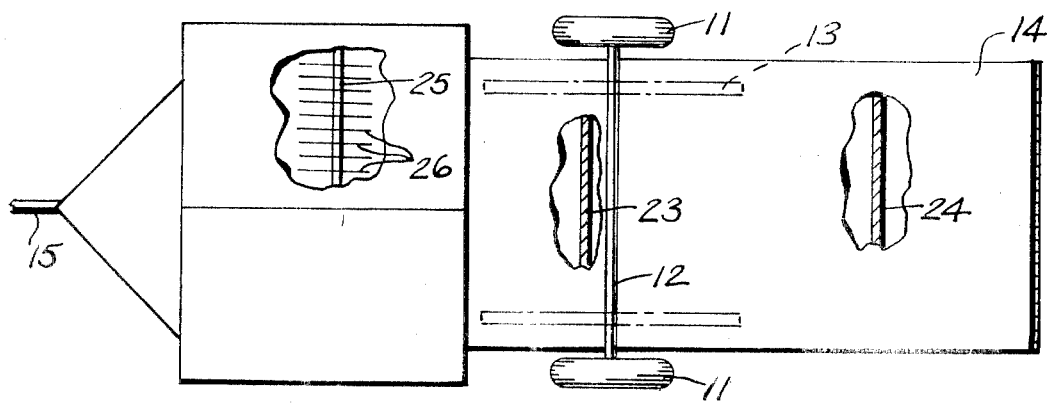
INVENTOR.
*William Lee Smalley*

United States Patent Office 3,514,149
Patented May 26, 1970

3,514,149
TRAILER
William Lee Smalley, Metairie, La.
(417 John Hopkins Drive, Kenner, La. 70062)
Filed May 24, 1968, Ser. No. 731,979
Int. Cl. B60p *3/32;* B60r *9/00*
U.S. Cl. 296—23                                       1 Claim

ABSTRACT OF THE DISCLOSURE

A trailer suitable for camping and picnicking having a plurality of compartments in which beds, chairs, water, ice, clothing and food may be stored. This trailer also has spaced apart rails on the top for tying down other items when necessary and doors on the side of the trailer allow for access to the interior compartments thereof.

This invention relates to automotive vehicle trailers, and more particularly to a camping and picnic trailer.

It is therefore the main purpose of this invention to provide a trailer which will have various compartments for storage of the necessary implements for camping and picnicking.

Another object of this invention is to provide a trailer which will have a kitchen section which would also open up to form a work table.

A further object of this invention is to provide a trailer which may be hooked up easily when desired and will contain all the necessary equipment for camping or picnicking without having to resort to filling the car that is pulling the trailer.

Other objects of the present invention are to provide a trailer which is simple in design, inexpensive to manufacture, rugged in construction, easy to use and efficient in operation.

These and other objects will become apparent upon a study of the following specification together with the accompanying drawing wherein:

FIG. 1 is a side view of the present invention shown in elevation and partly broken away;

FIG. 2 is a view of the opposite side of FIG. 1;

FIG. 3 is a fragmentary bottom plan view of FIG. 1.

According to this invention, a trailer 10 is provided with a pair of wheels 11 which are secured to an axle 12 which is supported on leaf springs 13 which are secured to the trailer bed 14. Trailer 10 is provided with a hook-up bar 15 for attachment to an automotive vehicle (not shown). Trailer 10 is also provided with side doors 16, 17 and 18 for access to their respective compartments 19, 20 and 21. Doors 16, 17 and 18 are secured to trailer 10 by hinges 22. Trailer 10 has internal partitions 23 and 24 for dividing the body section. When in compartment 19 of trailer 10 is secured an overhead rod 25 to which depends therefrom, a plurality of hangers 26 for suspending clothing within trailer 10. Compartment 19 serves as storage for beds, clothes and bedding, and compartment 20 accessible to by means of door 17 provides storage means for tents, lanterns, chairs, and so on. The compartment 21 provides storage space for chairs an ice chest, picnic basket and a water tub, and trailer 10 is also provided with a kitchen portion 27 with a food storage compartment 28 in the upper extremity thereof. The food storage compartment 28 is accessible to through the use of hinges 28'. A plurality of rails 29 of varnished oak wood are secured to vertical posts 30 of similar material and allow for the tying down of various other camping and picnicking equipment.

While various changes may be made in the detailed construction, it is understood that such changes will be within the spirit and scope of the present invention as is defined by the appended claim.

What I now claim is:

1. A mobile trailer comprising a hollow body and a pair of springs and wheels connected thereto, the said body comprising an upwardly extending forward portion and a lower elongated rearward portion providing storage compartments for camping equipment, a plurality of horizontal rails connected to the top of the said rearward portion to provide tie-down means for camping accessories, the said forward and rear portions are composed of parallel side walls, a pair of parallel end walls, vertical partitions and trailer bed, said compartments having doors hingeably secured to said side walls, bar means within the said upwardly extending portion of said body providing support means for clothes hangers, the rearward body portion containing cover means, a food storage compartment and a kitchen compartment therebelow, and an ice chest and water compartment having a door hingedly secured to one of the side walls, said upwardly extending portion being extended above the rearward portion for reducing air impact upon camping accessories tied down to the said rails.

References Cited

UNITED STATES PATENTS

| 2,493,258 | 1/1950 | Massare | 296—23 |
| 2,822,213 | 2/1958 | Smith | 296—23 |
| 3,149,876 | 9/1964 | Melbye | 296—23 |
| 3,188,694 | 6/1965 | Hammar | 52—73 X |

PHILIP GOODMAN, Primary Examiner

U.S. Cl. X.R.

52—73